United States Patent

[11] 3,553,501

| [72] | Inventor | Richard E. Thill<br>St. Paul, Minn. |
|---|---|---|
| [21] | Appl. No. | 706,080 |
| [22] | Filed | Feb. 16, 1968 |
| [45] | Patented | Jan. 5, 1971 |
| [73] | Assignee | the United States of America as represented by the Secretary of the Interior |

[54] ULTRASONIC PIEZOELECTRIC TRANSDUCER CARTRIDGE
6 Claims, 2 Drawing Figs.

[52] U.S. Cl. .................................................. 310/8.2,
340/10, 73/67
[51] Int. Cl. ......................................................... H04r 17/00
[50] Field of Search........................................... 310/8.2,
8.0, 8.3, 8.7, 9.1; 340/10, 8L(imped. match digest), 8MM(damping digest); 73/607

[56] References Cited
UNITED STATES PATENTS

| 2,972,068 | 2/1961 | Howry et al. ................ | 310/8.2 |
| 3,079,584 | 2/1963 | Sims............................ | 11/8.7X |
| 3,302,044 | 1/1967 | Lynnworth.................... | 310/8.2 |
| 3,376,438 | 4/1968 | Colbert ....................... | 310/8.2 |
| 3,378,705 | 4/1968 | Bacon ......................... | 310/8.2 |
| 3,403,271 | 9/1968 | Lobdell ........................ | 310/8.2 |
| 3,427,481 | 2/1969 | Lenahan....................... | 310/8.2 |

Primary Examiner—Milton O. Hirshfield
Assistant Examiner—Mark O. Budd
Attorneys—Ernest S. Cohen and Roland H. Shubert ABSTRACT: A transducer cartridge assembly providing means to readily interchange transducer crystals and to match crystal impedance with that of the backing member.

PATENTED JAN 5 1971

3,553,501

INVENTOR
RICHARD E. THILL

BY Ernest S. Cohen
ATTORNEY 3,553,501

ULTRASONIC PIEZOELECTRIC TRANSDUCER CARTRIDGE

BACKGROUND OF THE INVENTION

Laboratory measurements of sonic velocities in solid materials find use for example in the petrofabric investigation of rocks and in the correlation of seismic data with rock type. Sonic velocities and attenuation in solids such as rocks are conventionally measured by means of the ultrasonic pulse technique. From such measurements, the elastic constants of solids can be calculated.

There are two general variations of the ultrasonic pulse technique; through-transmission and reflection. In the through-transmission technique, a test sample of the material being investigated is placed between and in physical contact with two piezoelectric transducer elements, one acting as a driver and the other as a receiver. A pulse generator supplies a short-duration electrical pulse to the driver transducer. The electrical pulse is converted into a mechanical wave or impact by the transducer and this wave is transmitted into the sample. After traveling through the test specimen, the mechanical pulse, or elastic wave, is picked up by the receiving transducer, reconverted to an electrical signal, and displayed on the screen of a cathode ray oscilloscope. In the reflection technique, a single transducer acts both as driver and receiver.

The time required for the mechanical pulse or wave to pass through the sample is used to determine elastic wave velocity. Attenuation of the wave is measured by the relative amplitude of the oscilloscope signal.

Transducer response to an electrical pulse is governed primarily by its natural frequency. As an approximation, the driver transducer imparts to the test specimen a mechanical pulse having a frequency equal to the mechanical resonance frequency of the transducer crystal. In testing rock, the wavelength should be relatively large in comparison to grain size so as to avoid scattering effects. However, in order to obtain a close approximation of the longitudinal velocity in an unbounded medium, it is necessary that wavelengths be used which are short in comparison to lateral specimen dimensions. Since various rock types differ greatly in grain size and in grain size distribution, it is apparent that optimum test results require careful matching of the transducer frequency to the test sample.

In this invention there is provided a piezoelectric transducer cartridge providing convenient and flexible means for interchange of piezoelectric crystals and providing acoustical impedance matching between the crystal and backing member and between the crystal and test specimen.

It is an object of this invention to provide an improved piezoelectric transducer cartridge.

A further object of this invention is to provide an acoustic impedance matching and energy attenuating structure which may be conveniently and easily matched to the characteristics of the test specimen.

DESCRIPTION OF THE INVENTION

The invention will be more clearly understood from the following description of a preferred embodiment wherein reference is made to the accompanying drawings.

Figure 1:
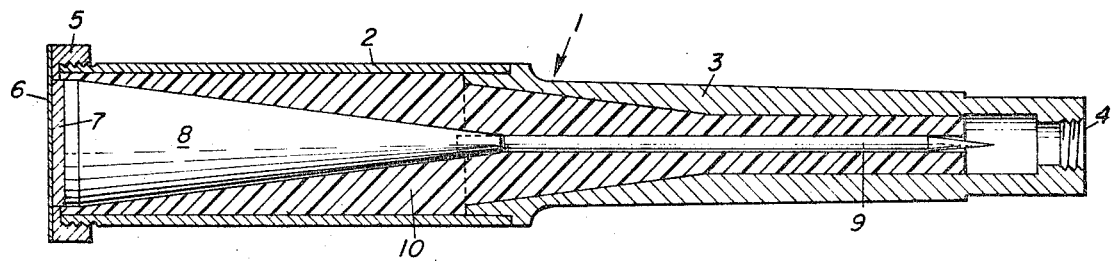
FIG. 1 is a cross-sectional view of the piezoelectric transducer cartridge assembly.

Referring now to FIG. 1, numeral 1 denotes generally the piezoelectric transducer cartridge of this invention. The cartridge comprises a front-housing section 2 constructed of a conductive metal. It is preferably of cylindrical shape and may conveniently be made of brass tubing. Rear-housing section 3 is also of a conductive metal and may be formed integrally with the front section or may comprise a separate element suitably joined to the front section as is shown on the drawing. The rear-housing section terminates in a threaded portion 4 to accept a standard coaxial cable connection. Such a provision insures complete electrical shielding of the entire cartridge structure and thus avoids external interference with the electrical signal impressed upon, or generated by, the transducer assembly.

Removable connected to the forward end of front-housing section 2 is collar 5 to which is permanently attached, as by soldering, metal shim 6. Piezoelectric transducer crystal 7 is mounted behind the collar and shim assembly which acts to hold the crystal in close physical contact with removable backing member 8. Crystal 7 preferably comprises a circular, disc-type commercially available transducer, operating in either the shear or longitudinal mode, and having plated electrodes on the parallel faces.

Backing member 8 comprises a regularly tapered, conical metal structure terminating in detachable electrode 9. Surrounding the backing member and electrode assembly is resinous packing material 10 which functions both as an electrical insulator and as a sonic energy attenuating medium. Resinous packing material 10 may conveniently comprise any formable resin or polymer composition having good insulation and sound absorbing qualities. One example of a suitable material is epoxy resin.

Backing member 8 performs four functions; it acts as a supporting structure for piezoelectric crystal 7, it acts as a crystal impedance matching device, it functions as a positive electrode and it acts as a dissipator of back-reflected energy. The backing member is interchangeable with others constructed of different metals by simply unscrewing it from electrode 9. Member 8 is constructed with a regular conical taper with the angle formed by the apex of the cone being substantially less than 90° and preferably less than 30°. Such a configuration concentrates back-reflected energy at the apex of the cone where it is dissipated by resinous packing material 10. By so dissipating the back-reflected energy, it is prevented from reentering the transducer and sample and thus interfering with the original energy pulse applied to the sample.

In the testing of rock samples, frequent changes of transducer crystals are necessary in order to provide an energy pulse of optimum wavelength and to alternate between longitudinal and shear modes. When transducer crystals are changed, for example, a ceramic element replacing a quartz element, the acoustical impedance relationships between the transducer crystal and the backing member also change. This in turn changes the $Q$ of the transducer, narrows or widens the transducer band width, increases or decreases ringing, increases or decreases pulse amplitude and affects the amount of energy transmitted into the backing member.

For optimum performance of the transducer assembly, it is desirable that the acoustical impedance of the transducer crystal be closely matched by the acoustical impedance of the backing member. Thus a change of transducer crystals usually requires a change in the backing member in order to obtain an impedance match. For example, some commercial PZT-type ceramic transducers operating in the longitudinal mode, have an acoustical impedance of about $2.5 \times 10^t$ 6gm./cm.2-sec. This impedance is fairly well matched by aluminum, $1.7 \times 10^6$gm./cm.2-sec or by tin, $2.46 \times 10^6$gm./cm.2-sec. In rock testing then, the advantages of providing readily interchangeable crystals and backing members are readily apparent.

Collar 5 is preferably threaded on its interior surface so as to be readily detachable from housing 2. This permits the convenient interchange of piezoelectric crystal 7 and backing member 8. The collar and shim assembly functions to contain and protect the transducer crystal, provides an electrode to ground, maintains electrical shielding over the front portion of the transducer cartridge and acts as an acoustical buffer between the crystal and the test specimen.

The amount of energy transmitted into a test specimen is dependent upon the mismatch in acoustical impedance between the transducer and the sample. If the mismatch is large, little energy will be transmitted into the sample. In such cases, much greater energy transmission may be obtained if a buffer having an acoustical impedance intermediate to that of the specimen and transducer crystal is interposed between the two. In this invention, such a buffer is provided by making shim 6 thick relative to the wavelength of the transducer crystal and intermediate in impedance between the crystal and test specimen. If, however, there is little mismatch in impedance between the crystal and sample, then shim 6 is made thin relative to the wavelength of the crystal. In either case, convenient interchangeability of the collar and shim assembly provides utmost flexibility in the testing of samples having varying characteristics.

Figure 2:
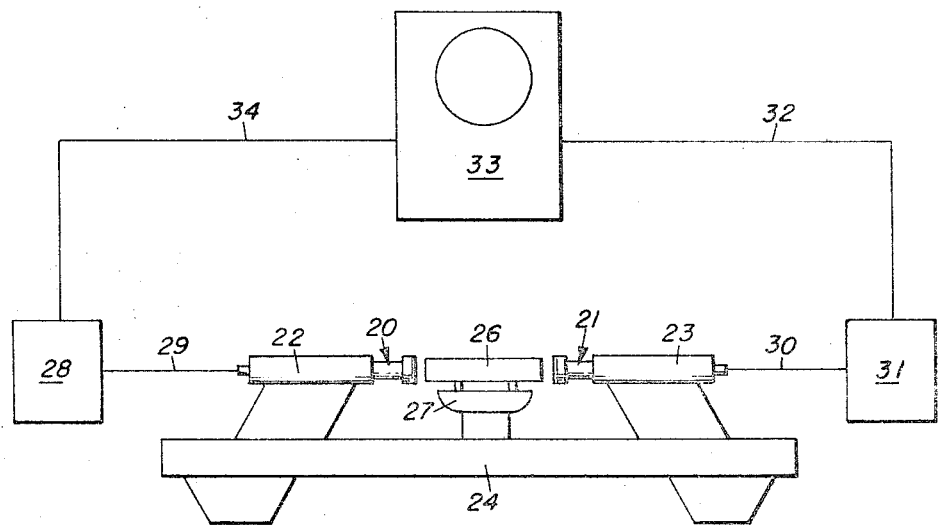
FIG. 2 is a diagrammatic representation of the transducer cartridge assemblies as used in determining sonic characteristics of solid test specimens.

Referring now to FIG. 2, there is illustrated a preferred apparatus for measurement of acoustical properties of a test specimen by the through-transmission technique.

Two identical piezoelectric transducer cartridges 20 and 21, such as that shown in FIG. 1, are mounted in holders 22 and 23. These holders are provided with a regular lathe taper matching the tapered rear portion of the cartridge housing. Holders 22 and 23 are slidably mounted on a two-rail acoustical bench 24 and can be secured at any position along the bench, Test specimen 26 is mounted on specimen holder-cradle 27 which also may be positioned at any point along the bench. Piezoelectric transducer cartridge 20 acts as the driver and is connected to pulse generator 28 by means of coaxial cable 29. Cartridge 21 acts as the receiving transducer and an electrical signal from that transducer cartridge is transmitted via cable 30 to wide-band amplifier 31. The amplified signal is then transmitted via cable 32 for display on the screen of cathode ray oscilloscope 33. The pulse trigger mechanism of generator 28 is connected to oscilloscope 33 by means of coaxial cable 34 so as to synchronize the horizontal sweep of the oscilloscope with the initiation of each output pulse of the generator.

In operation, the sample to be tested is secured in the specimen cradle, the two transducer cartridges are placed in close physical contact with the test specimen and are locked in place. The lathe taper configuration of the transducer cartridges and holders insure an automatic alignment of the transducer crystals with their axes parallel to the axis of the acoustical bench. Such parallel alignment is necessary to obtain accurate measurements of wave velocity in the sample.

Pulse generator 28 supplies an rectangular electrical pulse, typically in the range of about 50—700 volts amplitude and about 0.5—2.0 microseconds in duration, to the driver transducer. This transducer converts the electrical pulse to a mechanical pulse which travels through the test specimen, is picked up by the receiver transducer and reconverted to an electrical pulse. The electrical pulse is displayed on the oscilloscope screen where it may be photographed for detailed study.

In the reflection technique, only one transducer would contact the test specimen and both the pulse generator and oscilloscope would be connected to it.

While there have been shown and described the novel features of the invention as applied to a preferred embodiment, it will be understood that other forms and applications will be obvious to those skilled in the art. It is the intention, therefore, to be limited only as indicated by the scope of the following claims.

I claim:

1. An ultrasonic piezoelectric transducer cartridge for determining acoustical characteristics of test specimens comprising a flat piezoelectric crystal having parallel front and back surfaces, first conducting means in contact with said front surfaces, second conducting means in contact with said back surface, and second conducting means comprising a conically tapered solid metal member having an apex angle substantially less than 90° and having an acoustical impedance substantially matching the acoustical impedance of the piezoelectric crystal.

2. The device of claim 1 including an outer metallic housing member surrounding said piezoelectric crystal and said second conducting means and being detachably connected to said first conducting means.

3. The device of claim 2 including an electrically insulating and energy attenuating member disposed around and in contact with said conically tapered second conducting means and separating said means from said outer housing member.

4. The device of claim 3, wherein said apex angle is less than 30°.

5. The device of claim 4 wherein the acoustical impedance of said first conducting means is intermediate to that of said piezoelectric crystal and said test specimen.

6. The device of claim 5 wherein a portion of said outer metallic housing member is provided with a regular lathe taper.